United States Patent
Schwarzendahl

(10) Patent No.: US 10,040,925 B1
(45) Date of Patent: Aug. 7, 2018

(54) RUBBER MIXTURE AND VEHICLE TIRES

(71) Applicant: Continental Reifen Deutschland GmbH, Hannover (DE)

(72) Inventor: Corinna Schwarzendahl, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/750,190

(22) PCT Filed: Aug. 4, 2016

(86) PCT No.: PCT/EP2016/068624
§ 371 (c)(1),
(2) Date: Feb. 4, 2018

(87) PCT Pub. No.: WO2017/025421
PCT Pub. Date: Feb. 16, 2017

(30) Foreign Application Priority Data

Aug. 7, 2015 (DE) .................. 10 2015 215 152

(51) Int. Cl.
*C08L 7/00* (2006.01)
*B60C 1/00* (2006.01)

(52) U.S. Cl.
CPC .............. *C08L 7/00* (2013.01); *B60C 1/0025* (2013.01); *C08L 2201/08* (2013.01); *C08L 2205/02* (2013.01); *C08L 2205/035* (2013.01)

(58) Field of Classification Search
CPC .................................................. B60C 1/0025
USPC ....................................................... 523/152
See application file for complete search history.

(56) References Cited

U.S. PATENT DOCUMENTS

2016/0108211 A1* 4/2016 Busch ................ C08L 9/00
524/526
2016/0108212 A1* 4/2016 Busch ................ B60C 1/00
524/526

FOREIGN PATENT DOCUMENTS

| EP | 2821247 A1 | | 1/2015 |
| WO | WO 2015/000631 | * | 1/2015 |
| WO | WO 2015/000632 | * | 1/2015 |

OTHER PUBLICATIONS

VARAZON Sasol Wax (Year: 2010).*

* cited by examiner

*Primary Examiner* — Doris L Lee
(74) *Attorney, Agent, or Firm* — David L. Cate

(57) ABSTRACT

The invention relates to a rubber mixture and to a motor vehicle tire.
The rubber mixture comprises the following constituents:
at least one rubber and
at least one reinforcing filler and
0.5 to 10 phr of at least one hydrocarbon wax composition, where the hydrocarbons in the wax composition have 15 to 110 carbon atoms and where:
  a) 25% to 40% of the hydrocarbons are linear hydrocarbons having 20 to 30 carbon atoms; and where inter alia
  b) 5% to 18% of the hydrocarbons are linear hydrocarbons having 31 to 38 carbon atoms; and where inter alia
  c) 25% to 40% of the hydrocarbons are linear hydrocarbons having 39 to 60 carbon atoms,
where the percentage in each case is based on the total number of hydrocarbons having 15 to 110 carbon atoms.
The motor vehicle tire comprises the rubber mixture at least in an outer component.

10 Claims, No Drawings

RUBBER MIXTURE AND VEHICLE TIRES

The invention relates to a rubber mixture and to a motor vehicle tire.

It is known that motor vehicle tires comprise constituents that distinctly slow the aging and oxidation of the rubbers and other constituents present and hence have a positive effect on durability over a relatively long lifetime of the tire.

Moreover, however, it is also known that aging stabilizers present in the outer components of motor vehicle tires and antiozonant waxes can migrate to the surface and form a visible film there. This is called exudation and has an adverse effect on the visual appearance of the motor vehicle tire.

EP 0867472 A1 discloses a rubber mixture for the sidewall of motor vehicle tires, comprising a wax comprising a component having 45 or more carbon atoms in an amount of 3% to 10% by weight.

EP 1876037 B1 also discloses a rubber mixture comprising paraffin wax for the sidewall of motor vehicle tires.

EP 0490533 B1 discloses a rubber mixture comprising natural rubber and polypropylene and a paraffin wax mixture wherein the content of hydrocarbons having 31 to 44 carbon atoms is not less than 2 percent by weight in each case.

A common factor to the documents cited is that the composition of the rubber mixture is supposed to improve the visual appearance and/or cracking resistance.

JP S63-145346 discloses a rubber mixture comprising an antiozonant wax having two maxima in the distribution at $C_{24}$-$C_{29}$ and $C_{32}$-$C_{38}$. This is said to achieve better cracking resistance under ozone stress. There is no mention of the visual appearance.

Against the background of the prior art, it is thus an object of the invention to provide a rubber mixture for outer components of motor vehicle tires, which exhibits further improvement with regard to the exudation characteristics, and with no impairment or even an improvement in the ozone stability and aging stability, and also in the other physical properties such as tensile strength and/or hardness and/or friction properties and/or rebound resiliences.

The object is achieved in accordance with the invention in that the rubber mixture comprises the following constituents:
at least one rubber and
at least one reinforcing filler and
0.5 to 10 phr of at least one hydrocarbon wax composition, where the hydrocarbons in the wax composition have 15 to 110 carbon atoms and where:
   a) 25% to 40% of the hydrocarbons are linear hydrocarbons having 20 to 30 carbon atoms; and where
   b) 5% to 18% of the hydrocarbons are linear hydrocarbons having 31 to 38 carbon atoms; and where
   c) 25% to 40% of the hydrocarbons are linear hydrocarbons having 39 to 60 carbon atoms; and where
   d) 5% to 15% of the hydrocarbons are branched hydrocarbons having 21 to 31 carbon atoms; and where
   e) less than 5% of the hydrocarbons are branched hydrocarbons having 32 to 39 carbon atoms; and where
   f) 5% to 15% of the hydrocarbons are branched hydrocarbons having 40 to 61 carbon atoms,
where the percentage in each case is based on the total number of hydrocarbons having 15 to 110 carbon atoms.

Surprisingly, the rubber mixture shows improved exudation characteristics over the prior art, which is manifested in an improvement in visual appearance of the rubber mixture after an appropriate period of time. At the same time, ozone stability remains at a good level.

The hydrocarbon wax composition serves here as antiozonant wax and is described in detail below.

The unit "phr" (parts per hundred parts of rubber by weight) used in this document is the standard unit of amount for blend recipes in the rubber industry. The dosage of the parts by weight of the individual substances is always based here on 100 parts by weight of the total mass of all rubbers present in the mixture.

The rubber mixture of the invention comprises at least one rubber. It may also be a mixture of two or more rubbers. The at least one rubber is preferably selected from the group consisting of natural polyisoprene and/or synthetic polyisoprene and/or butadiene rubber and/or solution-polymerized styrene-butadiene rubber and/or emulsion-polymerized styrene-butadiene rubber and/or liquid rubbers having a molecular weight Mw of greater than 20 000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or isoprene-butadiene copolymer and/or hydrogenated styrene-butadiene rubber.

Particularly nitrile rubber, hydrogenated acrylonitrile-butadiene rubber, chloroprene rubber, butyl rubber, halobutyl rubber or ethylene-propylene-diene rubber are used in the production of industrial rubber articles such as cords, belts and hoses.

The at least one rubber is preferably at least one diene rubber, preferably selected from the group consisting of synthetic polyisoprene (IR) and natural polyisoprene (NR) and styrene-butadiene rubber (SBR) and polybutadiene (BR).

The rubber mixture of the invention, in a preferred embodiment, contains 15 to 65 phr of at least one natural polyisoprene and/or 15 to 65 phr of at least one synthetic polyisoprene. Preferably, the amount in this embodiment of natural and/or synthetic polyisoprene is 20 to 60 phr, more preferably 31 to 52 phr. This means that a combination of natural and synthetic polyisoprene is also conceivable.

In a particularly preferred embodiment of the invention, the rubber mixture contains 40 to 52 phr of at least one natural and/or synthetic polyisoprene. This means that a combination of natural and synthetic polyisoprene is also conceivable. However, this embodiment preferably involves natural polyisoprene. A rubber mixture of this kind, especially in the sidewall of motor vehicle tires, shows particularly good exudation characteristics and comparatively good friction and abrasion characteristics, especially after aging.

The rubber mixture of the invention, in a preferred embodiment, contains 15 to 85 phr, preferably 15 to 60 phr, of at least one polybutadiene.

In a particularly preferred embodiment of the invention, the rubber mixture contains 15 to 50 phr, most preferably 15 to 30 phr, of at least one polybutadiene. A rubber mixture of this kind, especially in the sidewall of motor vehicle tires, shows particularly good exudation characteristics and comparatively good friction and abrasion characteristics, especially after aging.

The rubbers, especially the diene rubbers mentioned, may be any of the types known to those skilled in the art.

The natural and/or synthetic polyisoprene may be either cis-1,4-polyisoprene or 3,4-polyisoprene. However, the use of cis-1,4-polyisoprenes with a cis-1,4 content >90% by weight is preferred. Firstly, it is possible to obtain such a polyisoprene by stereospecific polymerization in solution with Ziegler-Natta catalysts or using finely divided lithium alkyls. Secondly, natural rubber (NR) is one such cis-1,4-polyisoprene; the cis-1,4 content in the natural rubber is greater than 99% by weight.

In addition, also conceivable is a mixture of one or more natural polyisoprenes with one or more synthetic polyisoprenes.

The styrene-butadiene copolymer may be either solution-polymerized styrene-butadiene rubber (SSBR) or emulsion-polymerized styrene-butadiene rubber (ESBR), and it is also possible to use a mixture of at least one SSBR and at least one ESBR. The terms "styrene-butadiene rubber" and "styrene-butadiene copolymer" are used synonymously in the context of the present invention. Preference is given in each case to styrene-butadiene copolymers having a mean molecular weight of 100 000 to 600 000 g/mol (one hundred thousand to six hundred thousand grams per mole).

The polybutadiene (BR, butadiene rubber) may be any of the types known to those skilled in the art. These include so-called high-cis and low-cis types, butadiene rubber having a cis content of not less than 90% by weight being referred to as high-cis type and butadiene rubber having a cis content of less than 90% by weight as low-cis type. An example of a low-cis polybutadiene is Li-BR (lithium-catalyzed butadiene rubber) having a cis content of 20% to 50% by weight. An example of a high-cis polybutadiene is Nd-BR (neodymium-catalyzed butadiene rubber). With Nd-BR, particularly good vulcanizate properties of the rubber mixture are achieved.

The styrene-butadiene copolymer(s) and/or butadiene rubber(s) (polybutadiene(s)) used may have been end group-modified and/or functionalized along the polymer chains with modifications and functionalizations. The modification may be a modification having hydroxyl groups and/or ethoxy groups and/or epoxy groups and/or siloxane groups and/or amino groups and/or aminosiloxane and/or carboxyl groups and/or phthalocyanine groups and/or silane-sulfide groups. However, further modifications known to those skilled in the art, also known as functionalizations, are also suitable. Metal atoms may be a constituent of such functionalizations.

The rubber mixture of the invention, especially for use in motor vehicle tires, comprises at least one reinforcing filler. The reinforcing filler is preferably at least one carbon black and/or at least one silica.

It preferably contains 10 to 300 phr, preferably 30 to 300 phr, more preferably 30 to 200 phr, most preferably 30 to 100 phr, of at least one reinforcing filler selected from carbon black and/or silica.

The rubber mixture of the invention, in a preferred embodiment, contains 25 to 55 phr or 60 to 85 phr, preferably 25 to 49 phr or 70 to 80 phr, of at least one carbon black. A rubber mixture of this kind, especially in the sidewall and/or flange profile of motor vehicle tires, shows particularly good exudation characteristics and comparatively good friction characteristics, especially after aging.

In a very particularly preferred embodiment of the invention, the rubber mixture contains 25 to 43 phr, more preferably 27 to 38 phr, of at least one carbon black.

All types of carbon black known to those skilled in the art are conceivable. Preference is given, however, to using a carbon black having an iodine adsorption number to ASTM D 1510 of 15 to 100 g/kg, preferably 30 to 100 g/kg, more preferably 40 to 100 g/kg, and a DBP number to ASTM D 2414 of 30 to 150 mL/100 g, preferably 50 to 150 mL/100 g, more preferably 100 to 150 mL/100 g. In this way, in the case of use in a motor vehicle tire, particularly good rolling resistance and/or friction properties are achieved.

In a preferred embodiment of the invention, a carbon black having an iodine adsorption number to ASTM D 1510 of 80 to 100 g/kg and a DBP number to ASTM D 2414 of 115 to 127 mL/100 g is used.

In a further preferred embodiment of the invention, a carbon black having an iodine adsorption number to ASTM D 1510 of 40 to 60 g/kg and a DBP number to ASTM D 2414 of 115 to 127 mL/100 g is used.

The rubber mixture of the invention may, as well as carbon black, also comprise further known polar and/or nonpolar fillers.

Preferably, carbon black is present in the rubber mixture of the invention as the sole filler or as the main filler, meaning that the amount of carbon black is much greater than the amount of any other fillers present. If a further filler is present as well as carbon black, it is preferably silica. It is thus also conceivable that the rubber mixture of the invention comprises carbon black and silica, for example 25 to 55 phr of carbon black, preferably 25 to 49 phr, more preferably 25 to 43 phr and most preferably 27 to 38 phr of carbon black, in combination with 0.1 to 10 phr of silica. In a further preferred embodiment, the rubber mixture comprising the aforementioned amounts of carbon black contains 0 to 3 phr of silica.

In an alternative embodiment, for example, 60 to 85 phr of carbon black, preferably 70 to 80 phr of carbon black, is used in combination with 0.1 to 10 phr of silica. In a further preferred embodiment, the rubber mixture comprising the aforementioned amounts of carbon black contains 0 phr of silica, i.e. is free of silica.

The silicas may be the silicas known to those skilled in the art that are suitable as filler for tire rubber mixtures. However, particular preference is given to using a finely divided, precipitated silica which has a nitrogen surface area (BET surface area) (in accordance with DIN ISO 9277 and DIN 66132) of 35 to 350 $m^2/g$, preferably 35 to 260 $m^2/g$, more preferably 100 to 260 $m^2/g$ and most preferably 130 to 235 $m^2/g$, and a CTAB surface area (in accordance with ASTM D 3765) of 30 to 400 $m^2/g$, preferably 30 to 250 $m^2/g$, more preferably 100 to 250 $m^2/g$ and most preferably 125 to 230 $m^2/g$. Silicas of this kind lead to particularly good physical properties of the vulcanizates. In addition, advantages can arise in processing of the mixture as a result of a reduction in the mixing time while maintaining the same product properties that lead to improved productivity. Silicas used may therefore, for example, be either those of the Ultrasil® VN3 type (trade name) from Evonik or highly dispersible silicas known as HD silicas (e.g. Zeosil® 1165 MP from Rhodia).

To improve processibility and to attach the silica and any other polar fillers present to the diene rubber, it is possible to use silane coupling agents known to those skilled in the art in rubber mixtures.

One or more different silane coupling agents may be employed in combination with one another here. The rubber mixture may thus comprise a mixture of different silanes.

The silane coupling agents react with the surface silanol groups of the silica or other polar groups during the mixing of the rubber or of the rubber mixture (in situ) or in the manner of a pretreatment (premodification) even before addition of the filler to the rubber. As silane coupling agents, it is possible to use all silane coupling agents which are known to those skilled in the art for use in rubber mixtures.

Such coupling agents known from the prior art are bifunctional organosilanes which have at least one alkoxy, cycloalkoxy or phenoxy group as leaving group on the silicon atom and have, as other functionality, a group which can, optionally after dissociation, undergo a chemical reaction with the double bonds of the polymer. The latter group may, for example, be the following chemical groups:
—SCN, —SH, —NH$_2$ or –S$_x$— (with x=2 to 8).

For instance, silane coupling agents used may, for example, be 3-mercaptopropyltriethoxysilane, 3-thiocyanatopropyltrimethoxysilane or 3,3'-bis(triethoxysilylpropyl) polysulfides having 2 to 8 sulfur atoms, e.g. 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT can, for example, also be added as a mixture with industrial carbon black (trade name: X505® from Evonik).

Preference is given to using a silane mixture which contains 40% to 100% by weight of disulfides, more preferably 55% to 85% by weight of disulfides and most preferably 60% to 80% by weight of disulfides. A mixture of this kind is available, for example, under the Si 261® trade name from Evonik, which is described, for example, in DE 102006004062 A1.

Blocked mercaptosilanes, as are known, for example, from WO 99/09036, can also be used as silane coupling agent. It is also possible to use silanes as described in WO 2008/083241 A1, WO 2008/083242 A1, WO 2008/083243 A1 and WO 2008/083244 A1. It is possible to use, for example, silanes which are marketed under the NXT name (e.g. 3-(octanoylthio)-1-propyltriethoxysilane) in a number of variants from Momentive, USA, or those which are marketed under the name VP Si 363® by Evonik Industries.

It is also conceivable that one of the abovementioned mercaptosilanes, especially 3-mercaptopropyltriethoxysilane, is used in combination with processing aids (that are listed below), especially PEG carboxylates.

In a preferred embodiment of the invention, the rubber mixture comprises a combination of 3-mercaptopropyltriethoxysilane and PEG carboxylates, which results in particularly good properties, especially with regard to the technical problem to be solved, and a good level of properties overall with regard to the other properties.

In addition, the rubber mixture may contain further activators and/or agents for the binding of fillers, in particular carbon black. This may be, for example, the compound S-(3-aminopropyl)thiosulfuric acid disclosed in EP 2589619 A1 for example and/or metal salts thereof, whereby very good physical properties of the rubber mixture, especially in combination with at least one carbon black as filler, are achieved.

The recited silanes and activators are added in the production of the rubber mixture preferably in at least one preliminary mixing stage.

The rubber mixture of the invention may, as well as carbon black and optionally silica, also comprise further known polar and/or nonpolar fillers, such as aluminosilicates, kaolin, chalk, starch, magnesium oxide, titanium dioxide or rubber gels, and also fibers (for example aramid fibers, glass fibers, carbon fibers, cellulose fibers).

It is additionally conceivable for the rubber mixture to comprise carbon nanotubes (CNT) including discrete CNTs, known as hollow carbon fibers (HCF), and modified CNTs containing one or more functional groups such as hydroxyl, carboxyl and carbonyl groups). Graphite and graphenes and also "carbon-silica dual-phase filler" are also conceivable as filler.

The terms "vulcanized" and "crosslinked" are used synonymously in the context of the present invention, as also in the technical field.

Zinc oxide in the context of the present invention is not considered as a filler.

It is essential to the invention that the rubber mixture contains 0.5 to 10 phr of at least one hydrocarbon wax composition, where the hydrocarbons in the wax composition have 15 to 110 carbon atoms and where:
a) 25% to 40% of the hydrocarbons are linear hydrocarbons having 20 to 30 carbon atoms; and where
b) 5% to 18% of the hydrocarbons are linear hydrocarbons having 31 to 38 carbon atoms; and where
c) 25% to 40% of the hydrocarbons are linear hydrocarbons having 39 to 60 carbon atoms; and where
d) 5% to 15% of the hydrocarbons are branched hydrocarbons having 21 to 31 carbon atoms; and where
e) less than 5% of the hydrocarbons are branched hydrocarbons having 32 to 39 carbon atoms; and where
f) 5% to 15% of the hydrocarbons are branched hydrocarbons having 40 to 61 carbon atoms,
where the percentage in each case is based on the total number of hydrocarbons having 15 to 110 carbon atoms.

Hydrocarbons are molecules consisting of carbon and hydrogen.

The at least one hydrocarbon wax composition present in accordance with the invention includes hydrocarbons having 15 to 110 carbon atoms. All hydrocarbons covered by features a) up to and including f) are exclusively hydrocarbons having 15 to 110 carbon atoms.

For every number of carbon atoms in the hydrocarbons, the frequency of the hydrocarbons is determined and plotted against the number of carbon atoms, which gives the frequency distribution.

The frequency distribution of the at least one hydrocarbon wax composition, in the context of the present invention, is determined by means of gas chromatography (GC, EWF Method 001/03 from the European Wax Federation with: sample concentration 20 mg/20 mL of solvent; carrier gas: hydrogen, 71 cm/sec.; starting column temperature 75° C.; heating rates of 25° C./min to 100° C., 8° C./min to 325° C., hold at 325° C. for 15 min; column dimensions 25 m, 0.32 µm i.d., film thickness 0.12 µm; injector type: "cool on column"; result: frequency distribution as peak area %). This method likewise determines whether the hydrocarbon molecule is linear or branched.

The number and frequency of the hydrocarbon molecules with a particular number of carbon atoms the hydrocarbon molecule is proportional to the absolute signal intensity of the GC chromatogram with this number of carbon atoms per hydrocarbon molecule and can be determined therefrom.

"Linear hydrocarbons", in the context of the present invention, unless explicitly stated otherwise, are understood to mean linear aliphatic hydrocarbons.

"Branched hydrocarbons", in the context of the present invention, unless explicitly stated otherwise, are understood to mean branched aliphatic hydrocarbons.

The linear and branched hydrocarbons are acyclic.

The hydrocarbon wax composition is elucidated further hereinafter in preferred embodiments, which are conceivable independently of one another and in any combination of embodiments specified above and below.

In a preferred embodiment of feature a), 26% to 37% of hydrocarbons are linear hydrocarbons having 20 to 30 carbon atoms. This achieves particularly good exudation characteristics in the rubber mixture of the invention, which is manifested in an improvement in visual appearance of the rubber mixture after an appropriate period of time. At the same time, ozone stability remains at a good level.

In a preferred embodiment of feature c), 26% to 37% of hydrocarbons are linear hydrocarbons having 39 to 60 carbon atoms.

This, and the further preferred embodiments specified hereinafter relating to the frequency distribution of the hydrocarbon wax composition, achieves particularly good exudation characteristics in the rubber mixture of the invention, which is manifested in an improvement in visual appearance of the rubber mixture after an appropriate period of time. At the same time, ozone stability remains at a good level.

In a preferred embodiment of feature d), 6% to 8% of hydrocarbons are branched hydrocarbons having 21 to 31 carbon atoms.

In a preferred embodiment of feature f), 6% to 12% of hydrocarbons are branched hydrocarbons having 40 to 61 carbon atoms.

In a preferred embodiment of feature b), 10% to 16% of hydrocarbons are linear hydrocarbons having 31 to 38 carbon atoms.

In a preferred embodiment of feature e), 0.1% to 3% of hydrocarbons are branched hydrocarbons having 32 to 39 carbon atoms.

The hydrocarbon wax composition present in the rubber mixture of the invention is, moreover, preferably characterized by one or more of the following definitions:

The numerical ratio of the linear hydrocarbons of feature a) to the linear hydrocarbons of feature c) is between 0.5 and 1.5, more preferably between 0.6 and 1.2; and/or The numerical ratio of the branched hydrocarbons of feature d) to the branched hydrocarbons of feature f) is between 0.5 and 1.5, more preferably between 0.6 and 1.2; and/or The numerical ratio of the linear hydrocarbons of feature a) to the linear hydrocarbons of feature b) is between 1.5 and 3.5, more preferably between 1.6 and 3.2; and/or The numerical ratio of the linear hydrocarbons of feature c) to the linear hydrocarbons of feature b) is between 2.0 and 4.0, more preferably between 2.2 and 3.2; and/or The numerical ratio of the branched hydrocarbons of feature d) to the branched hydrocarbons of feature e) is between 2.5 and 6.5, more preferably between 2.8 and 6.0; and/or The numerical ratio of the branched hydrocarbons of feature f) to the branched hydrocarbons of feature e) is between 4.0 and 7.0, more preferably between 4.5 and 6.5; and/or The numerical ratio of the linear hydrocarbons of feature a) to the branched hydrocarbons of feature d) is between 3.0 and 6.0, more preferably between 3.5 and 5.5; and/or The numerical ratio of the linear hydrocarbons of feature c) to the branched hydrocarbons of feature f) is between 3.0 and 6.0, more preferably between 3.2 and 5.0; and/or The numerical ratio of the linear hydrocarbons of feature b) to the branched hydrocarbons of feature e) is between 6.0 and 12.0, more preferably between 6.4 and 11.2.

The references made to features a) to f) mean the respective number of carbon atoms in these hydrocarbons. "Linear hydrocarbons of feature a)" means, for example, linear hydrocarbons having 20 to 30 carbon atoms.

In addition, preferably 10% to 30%, more preferably 15% to 25%, of the hydrocarbons in the hydrocarbon wax composition are branched hydrocarbons.

The percentage is the proportion of branched hydrocarbons determined via the number thereof based on the total number of hydrocarbons having 15 to 110 carbon atoms of composition B.

This achieves particularly good exudation characteristics in the rubber mixture of the invention, which is manifested in an improvement in visual appearance of the rubber mixture after an appropriate period of time. At the same time, ozone stability remains at a good level.

The hydrocarbon wax composition present in the rubber mixture of the invention can additionally or alternatively be described as follows:

A hydrocarbon wax composition comprising linear and branched hydrocarbons having a frequency distribution, expressed via the number of hydrocarbon molecules per number of carbon atoms (per hydrocarbon molecule), which has at least two maxima between 15 and 110 carbon atoms, and the respective maximum represents the greatest number of hydrocarbon molecules within a range of +/−2 carbon atoms, and where at least one maximum of the linear hydrocarbons is at 23 to 33 carbon atoms and at least one maximum of the linear hydrocarbons is at 37 to 48 carbon atoms; and where at least one maximum of the branched hydrocarbons is at 23 to 33 carbon atoms and at least one maximum of the branched hydrocarbons is at 37 to 48 carbon atoms; and where the maximum having the greatest number of carbon atoms in the range between 23 and 33 carbon atoms and the maximum having the smallest number of carbon atoms in the range between 37 and 48 carbon atoms for the linear and branched hydrocarbons differ from one another by at least 12 carbon atoms; and where the frequency distribution does not have a maximum in said range of at least 12 carbon atoms either for linear or for branched hydrocarbons; and where the frequency distribution has at least one minimum for both linear and branched hydrocarbons at 30 to 36 carbon atoms in each case, where the minimum in each case represents the smallest number of hydrocarbon molecules within a range of +/−2 carbon atoms.

Preferably, the frequency distribution of this additional alternative definition has at least one maximum for the linear hydrocarbons at 23 to 30 carbon atoms, more preferably 24 to 29 carbon atoms.

Preferably, the frequency distribution of this additional alternative definition additionally has at least one maximum for the linear hydrocarbons at 39 to 48 carbon atoms, more preferably 40 to 43 carbon atoms.

Preferably, within the scope of the additional or alternative definition, the proportion of the branched hydrocarbons (number based on the total number of hydrocarbons) is between 15% and 25%.

The hydrocarbon wax composition described is present in the rubber mixture of the invention in amounts of 0.5 to 10 phr, preferably 1 to 5 phr, more preferably 1 to 3 phr.

As already set out above, the rubber mixture of the invention comprising the hydrocarbon wax composition described surprisingly shows improved exudation characteristics over the prior art, which is manifested in an improvement in visual appearance of the rubber mixture after an appropriate period of time. At the same time, ozone stability remains at a good level.

The hydrocarbon wax composition serves here as antiozonant wax.

It is also conceivable that, in addition to the hydrocarbon wax composition mentioned, further antiozonant waxes known in the prior art are present in the rubber mixture in amounts of 0 to 3 phr.

The hydrocarbon wax composition present in accordance with the invention in the rubber mixture of the invention, preferably in at least one base mixing stage, is added in the form of wax pellets or wax powder consisting of the hydrocarbon wax composition described. The hydrocarbon wax composition present can be obtained by selective mixing of various hydrocarbon wax components.

For example,
a first hydrocarbon wax component comprising 15 to 110 carbon atoms having more than 60% linear hydrocarbons having 20 to 30 carbon atoms can be mixed with a
second hydrocarbon wax component comprising 15 to 110 carbon atoms having more than 45%, preferably more than 60%, linear hydrocarbons having 39 to 60 carbon atoms in the molten state.

This may be followed by solidification, for example by spray cooling or pelletization or tableting.

Furthermore, the rubber mixture of the invention may comprise standard additives in customary proportions by weight. These additives include
a) aging inhibitors, such as N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ),
b) activators, for example zinc oxide and fatty acids (e.g. stearic acid),
c) resins, such as phenol resins and/or aliphatic resins, which are not plasticizer resins,
d) masticating aids, for example 2,2'-dibenzamidodiphenyl disulfide (DBD),
e) plasticizers, as described below, and
f) processing aids, for example fatty acid salts, for example zinc soaps, and fatty acid esters and derivatives thereof.

The proportion of the total amount of further additives is 3 to 150 phr, preferably 3 to 100 phr and more preferably 5 to 80 phr.

The total fraction of further additives also includes 0.1 to 4 phr, preferably 0.1 to 3.8 phr, particularly preferably 2 to 3.8 phr, of zinc oxide (ZnO). This may be any type of zinc oxide known to those skilled in the art, for example ZnO granulate or powder. The conventionally used zinc oxide generally has a BET surface area of less than 10 m$^2$/g. However, it is also possible to use a zinc oxide having a BET surface area of 10 to 100 m$^2$/g, for example so-called "nano-zinc oxides".

It is customary to add zinc oxide as an activator to a rubber mixture for sulfur crosslinking with vulcanization accelerators, usually in combination with fatty acids (e.g. stearic acid). The sulfur is then activated for the vulcanization by complex formation.

It is also possible for 0 to 70 phr, preferably 0.1 to 60 phr, preferably 3 to 30 phr, of at least one plasticizer, to be present in the rubber mixture, these being counted as one of the additives. The plasticizers used in the context of the present invention include all the plasticizers that are known to those skilled in the art, such as aromatic, naphthenic or paraffinic mineral oil plasticizers, for example MES (mild extraction solvate) or RAE (residual aromatic extract) or TDAE (treated distillate aromatic extract) and/or synthetic plasticizers and/or fatty acids and/or fatty acid derivatives and/or plasticizer resins and/or factices and/or glycerides and/or terpenes and/or biomass-to-liquid oils (BTL), preferably having a content of polycyclic aromatics of less than 3% by weight according to method IP 346, and/or rubber-to-liquid oils (RTL oils) and/or liquid polymers having a mean molecular weight (determination by GPC=gel permeation chromatography, in accordance with BS ISO 11344: 2004) between 500 and 20 000 g/mol. If additional liquid polymers are used as plasticizers in the rubber mixture of the invention, these are not counted as rubber in the calculation of the composition of the polymer matrix.

The plasticizer is preferably selected from the group consisting of the abovementioned plasticizers. Mineral oils are particularly preferred as plasticizer. When mineral oil is used, it is preferably selected from the group consisting of DAE (distilled aromatic extracts) and/or RAE (residual aromatic extracts) and/or TDAE (treated distilled aromatic extracts) and/or MES (mild extracted solvents) and/or naphthenic oil.

The vulcanization of the rubber mixture is preferably conducted in the presence of sulfur or sulfur donors with the aid of vulcanization accelerators, it being possible for some vulcanization accelerators to act simultaneously as sulfur donors.

Preferably, the rubber mixture of the invention is thus a sulfur-crosslinkable rubber mixture.

Sulfur or sulfur donors and one or more accelerators are added in the stated amounts to the rubber mixture in the last mixing step. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

Preference is given to using a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS).

Sulfur-donating substances used may be any sulfur-donating substances known to those skilled in the art. If the rubber mixture contains a sulfur-donating substance, it is preferably selected from the group containing, for example, thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis(O,O-2-ethylhexylthiophosphoryl) polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N,N-dibenzylthiocarbamoyldithio)hexane and/or diaryl polysulfides and/or dialkyl polysulfides.

Further network-forming systems as obtainable, for example, under the Vulkuren®, Duralink® or Perkalink® trade names or network-forming systems as described in WO 2010/049216 A2 can also be used in the rubber mixture. This system contains a vulcanizing agent which crosslinks with a functionality of greater than four and at least one vulcanization accelerator. The vulcanizing agent which crosslinks with a functionality of greater than four has, for example, the general formula A):

where G is a polyvalent cyclic hydrocarbon group and/or a polyvalent heterohydrocarbon group and/or a polyvalent siloxane group containing 1 to 100 atoms; where each Y is selected independently from a rubber-active group containing sulfur-containing functionalities; and where a, b and c are integers where, independently, a=0 to 6; b=0 to 8; and c=3 to 5.

The rubber-active group is preferably selected from a thiosulfonate group, a dithiocarbamate group, a thiocarbonyl group, a mercapto group, a hydrocarbon group and a sodium thiosulfonate group (Bunte salt group). Very good abrasion and tensile properties of the rubber mixture according to the invention are achieved in this way.

In the context of the present invention, sulfur and sulfur donors, including sulfur-donating silanes such as TESPT, and vulcanization accelerators as described above and vulcanizing agents which crosslink with a functionality of greater than four, as described in WO 2010/049216 A2, for example a vulcanizing agent of the formula A), and also the abovementioned Vulkuren®, Duralink® and Perkalink® systems are encompassed by the term "vulcanizing agent".

The rubber mixture of the invention preferably comprises at least one vulcanizing agent selected from the group comprising sulfur and/or sulfur donors and/or vulcanization accelerators and/or vulcanizing agents which crosslink with a functionality greater than four. In this way, it is possible to produce vulcanizates from the rubber mixture of the invention, especially for use in vehicle tires.

In a further development of the invention, two or more accelerators are present in the rubber mixture.

Particular preference is given to the use of the accelerators TBBS and/or CBS and/or diphenylguanidine (DPG).

In addition, vulcanization retarders may be present in the rubber mixture.

Preferably, the rubber mixture of the invention contains elemental sulfur in amounts of 0.5 to 3 phr, preferably 1 to 3 phr, more preferably 1 to 2.7 phr, most preferably 1.3 to 2.4 phr. In a particularly preferred embodiment of the invention, the rubber mixture contains 2.0 to 2.4 phr of sulfur.

A rubber mixture of this kind, especially in the sidewall of motor vehicle tires, shows particularly good exudation characteristics and comparatively good friction and abrasion characteristics, especially after aging.

Preferably, the rubber mixture of the invention contains at least one sulfenamide accelerator in amounts of 0.1 to 4 phr, more preferably 0.1 to 3 phr, most preferably 0.5 to 3 phr.

In a particularly preferred embodiment of the invention, the rubber mixture contains 0.9 to 1.3 phr of at least one sulfenamide accelerator.

A rubber mixture of this kind, especially in the sidewall of motor vehicle tires, shows particularly good exudation characteristics and comparatively good friction and abrasion characteristics, especially after aging.

The rubber mixture of the invention is produced by processes which are customary in the rubber industry and in which a base mixture comprising all constituents apart from the vulcanization system (sulfur and vulcanization-influencing substances) is firstly produced in one or more mixing stages. The final mixture is produced by adding the vulcanization system in a final mixing stage. The finished mixture is processed further, for example, by an extrusion operation and converted to the appropriate shape.

It is a further object of the present invention to provide a motor vehicle tire that features an improved visual appearance with regard to exudation characteristics, with no impairment and/or even an improvement in ozone resistance and aging stability, and also in the other tire properties such as handling characteristics and/or wet braking and/or tear properties and/or rolling resistance. This object is achieved in that the motor vehicle tire comprises at least one vulcanizate of at least one rubber mixture as described above in at least one component. In this case, all the details given above relating to the constituents and their features are applicable.

Preferably, the motor vehicle tire is a pneumatic motor vehicle tire.

Preferably, the component is an outer component, more preferably at least one sidewall and/or at least one flange profile.

Most preferably, it is the sidewall.

The invention is now to be illustrated in detail with reference to comparative examples and working examples, which are summarized in table 1.

The comparative mixtures are labelled C, the inventive mixture I.

Table 2 compares the essential properties of the frequency distributions of the hydrocarbon wax compositions (antiozonant waxes) used. In this context, the waxes identified by C represent the waxes from the prior art used in the comparative mixtures. The hydrocarbon wax composition identified by I is present in the inventive rubber mixture I1.

The mixture was produced under standard conditions in two stages in a laboratory tangential mixer. Test samples were produced by vulcanization from all of the mixtures, and these test samples were used to determine material properties typical for the rubber industry. For the above-described tests on test specimens, the following test methods were employed:

Shore A hardness (unit: Shore A, abbreviated to ShA) at room temperature (RT) in accordance with DIN 53 505

Rebound resilience (rebound for short) at room temperature (RT) in accordance with DIN 53 512 tensile strength at room temperature in accordance with DIN 53 504

Exudation characteristics: vulcanizates are stored for 3 months, protected from moisture and insolation, and then visually evaluated. Class 1: satisfactory visual appearance, class 2: adequate visual appearance, class 3: inadequate visual appearance Ozone stability at room temperature in accordance with DIN 53 509/DIN ISO 1431-1 similar conditions: ozone concentration 200 pphm, +/−30 pphm, temperature 25° C. +/−3° C., 60% +/−5% air humidity and a static expansion between 10 and 60%, with assessment in accordance with DIN 53 509/DIN ISO 1431-1, assessment: positive (no cracking) or negative (cracking)

TABLE 1

| | Unit | C1 | C2 | I1 |
|---|---|---|---|---|
| Constituents | | | | |
| TSR natural rubber | phr | 40 | 40 | 40 |
| Polyisoprene, synthetic | phr | 10 | 10 | 10 |
| Butadiene rubber [A)] | phr | 20 | 20 | 20 |
| SBR [B)] | Phr | 30 | 30 | 30 |
| Carbon black N339 | phr | 33 | 33 | 33 |
| Aging inhibitor | phr | 5 | 5 | 5 |
| Other additives [F)] | phr | 14.5 | 14.5 | 14.5 |
| Antiozonant wax A [C)] | phr | 2.3 | — | — |
| Antiozonant wax B [D)] | phr | — | — | 2.3 |
| Antiozonant wax C [E)] | phr | — | 1.5 | — |
| Sulfur and sulfenamide accelerator | phr | 3.3 | 3.3 | 3.3 |
| Properties | | | | |
| Tensile strength at RT | MPa | 13.1 | 13.1 | 12.6 |
| Rebound resilience at RT | % | 49 | 49 | 49 |
| Shore hardness at RT | Shore A | 51 | 51 | 51 |
| Exudation characteristics | Class | 2 | 3 | 1 |
| Ozone stability | | positive | positive | positive |

[A)] butadiene rubber, Nd-catalyzed, high-cis BR
[B)] styrene-butadiene rubber, solution-polymerized, SBR 1500
[C)] antiozonant wax A: comparative wax, VARAZON ® 6500, from Sasol Wax GmbH, frequency distribution: see table 2
[D)] antiozonant wax B: frequency distribution according to claim 1: see table 2
[E)] antiozonant wax C: comparative wax, VARAZON ® 6066, from Sasol Wax GmbH, frequency distribution: see table 2
[F)] other additives: zinc oxide, stearic acid, plasticizer inter alia

TABLE 2

| Feature | % hydrocarbons according to claim 1 | A [%] C | C [%] C | B [%] I |
|---|---|---|---|---|
| a) $C_{20-30}$ (linear) | 25 to 40 | 29.0 | 41.4 | 26.4 |
| c) $C_{39-60}$ (linear) | 25 to 40 | 15.2 | 3.4 | 35.4 |
| d) $C_{21-31}$ (branched) | 5 to 15 | 2.2 | 8.7 | 7.0 |
| f) $C_{40-61}$ (branched) | 5 to 15 | 10.1 | 7.0 | 10.8 |
| b) $C_{31-38}$ (linear) | 5 to 18 | 35.4 | 22.2 | 15.2 |
| e) $C_{32-39}$ (branched) | less than 5 | 7.3 | 17.3 | 2.3 |

Table 2 shows the frequencies of the various hydrocarbons in the hydrocarbon wax compositions A, B and C in % as determined by means of GC by the method described above.

In addition, 21% of the hydrocarbons in the wax composition B used in the inventive example are branched hydrocarbons. The percentage is the proportion of branched hydrocarbons determined via the number thereof based on the total number of hydrocarbons having 15 to 110 carbon atoms of composition B.

The wax composition can be obtained, for example, by mixing the following wax components:
- 45% by weight of a refined paraffin wax having a solidification point to ASTM D 938 of 52 to 54° C., comprising 81.3% linear hydrocarbons having 20 to 30 carbon atoms (Sasolwax 5203); and
- 45% by weight of a paraffin wax obtained via Fischer-Tropsch, having a solidification point to ASTM D 938 of 83° C., comprising 48.5% linear hydrocarbons having 39 to 60 carbon atoms (Sasolwax C80); and
- 10% by weight of a hydrotreated microcrystalline wax having a solidification point to ASTM D 938 to 78° C., comprising 74.5% branched hydrocarbons (Sasolwax 3279).

As apparent from table 1, the inventive rubber mixture I1, compared to the comparative mixtures C1 and C2, exhibits better exudation characteristics, which means that the inventive mixture is at a satisfactory level. At the same time, there is no significant impairment of the other properties, especially the ozone resistance and properties such as tensile strength, hardness and rebound resilience.

The invention claimed is:

1. A rubber mixture comprising at least the following constituents:
   at least one rubber;
   at least one reinforcing filler; and,
   0.5 to 10 phr of at least one hydrocarbon wax composition, wherein the hydrocarbons in the wax composition have 15 to 110 carbon atoms and wherein:
   a) 25% to 40% of the hydrocarbons are linear hydrocarbons having 20 to 30 carbon atoms; and wherein
   b) 5% to 18% of the hydrocarbons are linear hydrocarbons having 31 to 38 carbon atoms; and wherein
   c) 25% to 40% of the hydrocarbons are linear hydrocarbons having 39 to 60 carbon atoms; and wherein
   d) 5% to 15% of the hydrocarbons are branched hydrocarbons having 21 to 31 carbon atoms; and wherein
   e) less than 5% of the hydrocarbons are branched hydrocarbons having 32 to 39 carbon atoms; and wherein
   f) 5% to 15% of the hydrocarbons are branched hydrocarbons having 40 to 61 carbon atoms;
   wherein the percentage in each case is based on the total number of hydrocarbons having 15 to 110 carbon atoms.

2. The rubber mixture as claimed in claim 1, wherein the rubber mixture comprises at least one diene rubber selected from the group consisting of synthetic polyisoprene, natural polyisoprene (NR), styrene-butadiene rubber (SBR) and polybutadiene (BR).

3. The rubber mixture as claimed in claim 1, wherein 26% to 37% of the hydrocarbons are linear hydrocarbons having 20 to 30 carbon atoms.

4. The rubber mixture as claimed in claim 1, wherein 26% to 37% of the hydrocarbons are linear hydrocarbons having 39 to 60 carbon atoms.

5. The rubber mixture as claimed in claim 1, wherein 10% to 30% of the hydrocarbons in the hydrocarbon wax composition are branched hydrocarbons.

6. The rubber mixture as claimed in claim 1, wherein the rubber mixture comprises at least one carbon black as reinforcing filler.

7. The rubber mixture as claimed in claim 6, wherein the rubber mixture contains 25 to 55 phr of at least one carbon black.

8. The rubber mixture as claimed in claim 6, wherein the rubber mixture contains 60 to 85 phr of at least one carbon black.

9. A motor vehicle tire comprising at least one vulcanizate of at least one rubber mixture as claimed in claim 1, and wherein the at least one vulcanizate is comprised in at least one outer component of the motor vehicle tire.

10. The motor vehicle tire as claimed in claim 9, wherein the at least one outer component is at least a sidewall and/or a flange profile.

* * * * *